United States Patent [19]

Shimizu

[11] 4,436,336

[45] Mar. 13, 1984

[54] HATCHBACK DOOR OF A MOTOR VEHICLE

[75] Inventor: Tetsuo Shimizu, Yokohama, Japan

[73] Assignee: Nissan Motor Company, Limited, Yokohama, Japan

[21] Appl. No.: 317,772

[22] Filed: Nov. 3, 1981

[30] Foreign Application Priority Data

Dec. 3, 1980 [JP] Japan ............................ 55-173365[U]

[51] Int. Cl.³ .............................................. B62D 25/00
[52] U.S. Cl. ........................................ 296/76; 49/383; 49/462
[58] Field of Search ................ 296/50, 146, 76, 37.16; 49/383, 462

[56] References Cited

U.S. PATENT DOCUMENTS 4,306,380 12/1981 Vettel .................................. 296/146
4,343,504 8/1982 Tomioka et al. ....................... 296/76

FOREIGN PATENT DOCUMENTS 2033458A of 0000 United Kingdom .
1440881 of 0000 United Kingdom .

Primary Examiner—Robert R. Song
Attorney, Agent, or Firm—Lane, Aitken & Kananen

[57] ABSTRACT

In a motor vehicle having a hatchback door of glass which is hinged at its upper portion to the vehicle body to be swingable upwardly and downwardly to open and close a door opening formed in the vehicle body, the hatchback door is equipped at its lower end portion with an elongate strip of flexible elastic material which extends along the entire of the lower portion in a manner to cover at least the extreme edge of the lower portion.

3 Claims, 3 Drawing Figures

HATCHBACK DOOR OF A MOTOR VEHICLE

BACKGROUND OF THE INVENTION

1. Field of the Invention

The present invention relates in general to a door construction of a motor vehicle, and more particularly to a hatchback door of the vehicle, which is upwardly and downwardly swingable relative to the vehicle body to open and close a door opening formed in the vehicle body.

2. Description of the Prior Art

Some modernized motor vehicles are equipped with a frameless hatchback door of glass for the purpose of improving the rear visibility taken through the door from the vehicle cabin and reducing the production cost of the vehicle. Usually, for reinforcing the glass door, it is equipped with an elongate "rigid" strip, made of metal, which extends along the lower edge portion of the door. This construction, however, induces a problem in that when closing the door, the operator may get hurt on his fingers by putting them between the rigid strip on the door and an edge of the door opening formed in the vehicle body.

SUMMARY OF THE INVENTION

It is therefore an essential object of the present invention to provide an improved hatchback door for a motor vehicle, which is free of the above-mentioned problem.

BRIEF SUMMARY OF THE INVENTION

According to the present invention, there is provided a motor vehicle having a hatchback door of glass which is swingable upwardly and downwardly relative to the vehicle body to open and close a door opening formed in the vehicle body, which is characterized in that the hatchback door is equipped at the other edge portion with an elongate strip of flexible elastic material which extends along the entire of the other edge portion in a manner to cover at least the extreme edge of the other edge portion.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
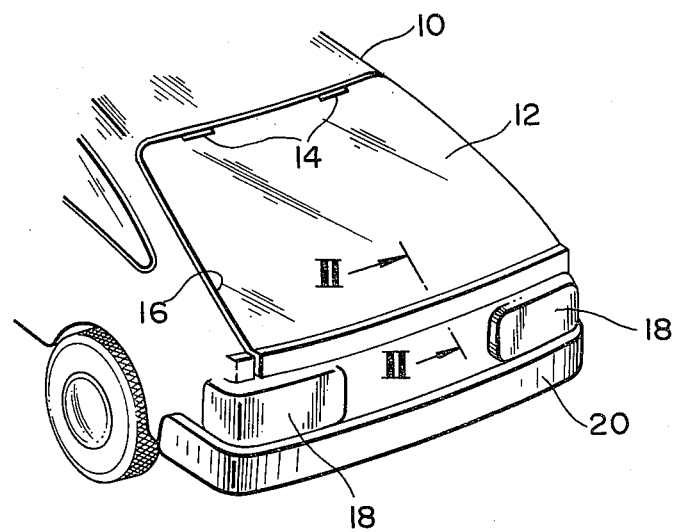
FIG. 1 is a rear view of a passenger motor vehicle to which a hatchback door of a first embodiment of the present invention is mounted.
Figure 2:
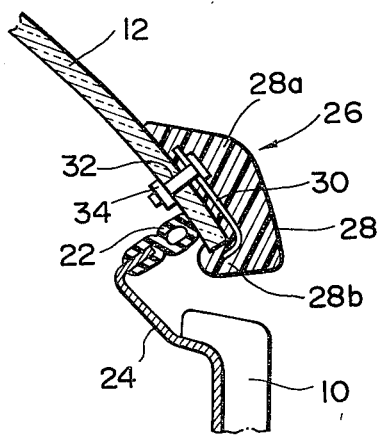
FIG. 2 is an enlarged sectional view taken along the line II—II of FIG. 1.

Referring to FIGS. 1 and 2, and particularly to FIG. 1, there is shown a first embodiment of the present invention which is applied to a passenger motor vehicle 10. The hatchback door 12 of this embodiment is constructed of glass and hinged to the vehicle body at upper portions thereof 14 to be swingable upward and downward to open and close a door opening 16 formed in the vehicle body. Designated by numerals 18 and 20 are tail lamps and a rear bumper, respectively.

As is seen from FIG. 2, a weatherstrip 22 is mounted via a sill 24 to the vehicle body 10 to extend along the periphery of the door opening 16. Thus, when the door 12 is in its closed position, tight sealing is assured between the door 12 and the weatherstrip 22.

The door 12 is equipped at its lower edge with an elongate protector 26 which extends substantially straightly along the entire of the lower edge portion of the door 12, as is seen from FIG. 1. As is well shown by FIG. 2, the protector 26 comprises an elongate flexible elastic strip 28 which includes a main-portion 28a covering the outside surface of the lower edge portion of the door 12 and a sub-portion 28b straddling the lower edge of the door 12 to cover the inside surface of the lower edge portion of the door 12. It should be noted that the sub-portion 28b of the strip 28 does not reach the portion where the weatherstrip 22 is to be placed upon closing of the door 12. The elongate elastic strip 28 is constructed of, for example, a foamed polyurethane or the like, which has a suitable flexibility not to cause a critical deformation of the glass door 12 even when receiving a considerable impact. An elongate retainer 30 is embedded in the strip 28 and extends along the length of the same. The retainer 30 has a plurality of spaced bolts 32 secured thereto, which bolts extend therefrom and are inserted in the corresponding holes (no numerals) formed in the door 12, with their leading ends projected from the inside surface of the door 12. Nuts 34 are screwed to the projected ends of the bolts 32 to assure the connection of the strip 28 to the door 12. Preferably, for achieving better external view of the vehicle, the outside surface of the elongate protector 26 may be constructed to become flush with that of the vehicle body 10 (see FIG. 2) when closing the door 12.

Figure 3:
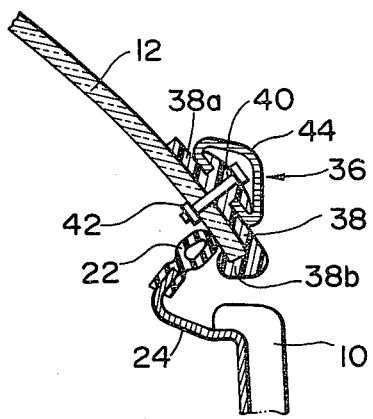
FIG. 3 is a view similar to FIG. 2, but showing a second embodiment of the present invention.

Referring to FIG. 3, there is shown a second embodiment of the present invention, which is a modification of the hatchback door of the first embodiment. Thus, substantially the same parts as those in the first embodiment are designated by the same numerals.

As is seen from this drawing, the protector 36 of the second embodiment comprises an elongate elastic strip 38, of foamed polyurethane or the like, which includes a main-portion 38a covering the outside surface of the lower edge portion of the door 12 and a sub-portion 38b straddling the lower edge of the door 12 to cover the inside surface of the lower edge portion of the door 12. Similar to the case of the first embodiment, the sub-portion 38b of the strip 38 does not reach the portion where the weatherstrip 22 is to be placed. A plurality of spaced bolts 40 are passed through the strip 38 and the door 12 and engaged with the corresponding nuts 42 to assure the connection of the strip 38 to the door 12. A molding 44 having a generally C-shaped cross section is secured to the main-portion 38a of the strip 38 in a manner to extend along the length of the same. As is seen from the drawing, the leading ends of the side walls of the molding 44 are snugly received in the corresponding grooves (no numerals) formed in the strip 38, thereby to achieve tight connection between the molding 44 and the strip 38. By the presence of the molding 44, the ugly head of each bolt 40 is concealed from the exterior of the vehicle.

As is understood from the above, the hatchback door of the present invention has at its lower edge portion a safety protector of flexible material. Thus, even when the operator's fingers get between the door 12 and the edge of the door opening 16 by accident upon closing of the door 12, the flexibility of the protector protects the operator from getting hurt. Further, even when some foreign hard materials collide with the lower edge portion of the door 12, the protector will absorb the shocks thereby preventing the breakage of the door. In addition to the above, if the protector on the door 12 is constructed to have the external views as shown by FIGS. 2 and 3, the aerodynamic characteristic of the vehicle is improved thereby preventing generation of air vortex at the rear of the vehicle under cruising.

What is claimed is:

1. A hatchback door assembly for a vehicle comprising:
    a hatchback door of glass hinged at its one edge portion to the vehicle body to be swingable upward and downward relative to the vehicle body to open and close a door opening formed in said vehicle body;
    an elongate strip of flexible elastic material which is attached to the other edge portion of said door in a manner to extend along the entire of the other edge portion and to cover at least the extreme edge of same, said elongate strip including a main-portion covering the outside surface of the other edge portion and a sub-portion straddling the extreme edge of the other edge portion to cover the inside surface of the other edge portion;
    an elongate retainer embedded in the main-portion of said strip to extend along the length of said strip; and
    bolts and nuts for securing said strip to said glass door, each bolt being secured to said retainer and extending therefrom to be inserted in the corresponding hole formed in the glass door having its leading end projected from the inside surface of the glass door, each nut being screwed to the projected end of the corresponding bolt to assure the connection of the strip to said glass door.

2. A hatchback door assembly for a vehicle comprising:
    a hatchback door of glass hinged at its one edge portion to the vehicle body to be swingable upward and downward relative to the vehicle body to open and close a door opening formed in said vehicle body;
    an elongate strip of flexible elastic material which is attached to the other edge portion of said door in a manner to extend along the entire of the other edge portion and to cover at least the extreme edge of same, said elongate strip including a main-portion covering the outside surface of the other edge portion and a sub-portion straddling the extreme edge of the other edge portion to cover the inside surface of the other edge portion;
    bolts and nuts for securing the strip to said glass door, each bolt being passed through the corresponding aligned holes formed in said strip and said glass having its leading end projected from the inside surface of said glass door, each nut being screwed to the projected end of the corresponding bolt to assure the connection of the strip to said glass door; and
    an elongate molding having a generally C-shaped cross section, said moulding being secured to the outer surface of said main-portion of the strip to extend along the length of the strip in a manner to conceal the head portions of bolts from the exterior of the vehicle.

3. A hatchback door assembly as claimed in claim 2, in which the leading ends of the side walls of said moulding are snugly received in opposed grooves formed in the main-portion of said strip.

* * * * *